United States Patent
Piscopo et al.

(10) Patent No.: US 6,830,271 B2
(45) Date of Patent: Dec. 14, 2004

(54) TWO-HANDLED SHOVEL

(76) Inventors: Anthony M. Piscopo, 3497 Spencer La., Brunswick, OH (US) 44121; Angela A. Piscopo, 3497 Spencer La., Brunswick, OH (US) 44121

( * ) Notice: Subject to any disclaimer, the term of this patent is extended or adjusted under 35 U.S.C. 154(b) by 14 days.

(21) Appl. No.: 10/383,344

(22) Filed: Mar. 6, 2003

(65) Prior Publication Data

US 2003/0173789 A1 Sep. 18, 2003

Related U.S. Application Data

(60) Provisional application No. 60/363,690, filed on Mar. 12, 2002.

(51) Int. Cl.[7] .............................. A01B 1/22; B25G 3/00
(52) U.S. Cl. ........................................... 294/58; 16/426
(58) Field of Search ............................. 294/57, 58, 59; 16/426

(56) References Cited

U.S. PATENT DOCUMENTS

| | | | |
|---|---|---|---|
| 842,912 A | 2/1907 | Rundell | |
| 933,647 A | * 9/1909 | Hunt | ............................ 294/58 |
| 3,155,414 A | 11/1964 | Bales | |
| 3,372,510 A | * 3/1968 | Arsenault | .................... 43/21.2 |
| 3,751,094 A | 8/1973 | Bohler | |
| 4,050,728 A | 9/1977 | Davidson | |
| 4,128,266 A | 12/1978 | Vaslas | |
| 4,155,582 A | 5/1979 | Reisner | |
| 4,615,553 A | 10/1986 | Hultine | |
| 4,690,447 A | 9/1987 | Adams | |
| 4,787,661 A | 11/1988 | Rutledge | |
| 4,793,645 A | 12/1988 | Decker | |
| 4,911,575 A | 3/1990 | Tidwell | |
| 4,944,541 A | 7/1990 | Waldschmidt | |
| 5,016,148 A | * 5/1991 | Kohm | ......................... 362/102 |
| 5,133,582 A | 7/1992 | Rocha | |
| 5,137,317 A | 8/1992 | Biemiek | |
| 5,400,471 A | 3/1995 | Lichfield et al. | |
| 5,411,305 A | 5/1995 | Revoldt | |
| 5,669,650 A | 9/1997 | Rutz | |
| 6,601,887 B2 | * 8/2003 | Graves | ......................... 294/58 |

* cited by examiner

Primary Examiner—Dean J. Kramer
(74) Attorney, Agent, or Firm—Christopher H. Hunter

(57) ABSTRACT

A shovel for snow, dirt or other product comprises a main shovel handle having a main hand grip and a main pole which is attached to a blade; and an auxiliary handle having an auxiliary hand grip and an auxiliary pole. According to one aspect, the auxiliary pole has a threaded end which is received in a threaded bore in the main pole. The auxiliary pole can be easily attached and detached from the main pole. Adhesive can also be used. According to further aspects, a separate connecting device connects the auxiliary pole to the main pole. In one further aspect, the connecting device has a first branch threadably attached to the main pole, a second branch threadably attached to the auxiliary pole, and a third branch threadably attached to the blade. The connecting device could also be formed as a cuff or sleeve and entirely surround the main pole and be attached thereto such as with a screw, or could be formed in a semicircular cuff and be attached to the main pole such as with bands or clamps. In any case the auxiliary pole can be easily connected to the main pole.

18 Claims, 4 Drawing Sheets

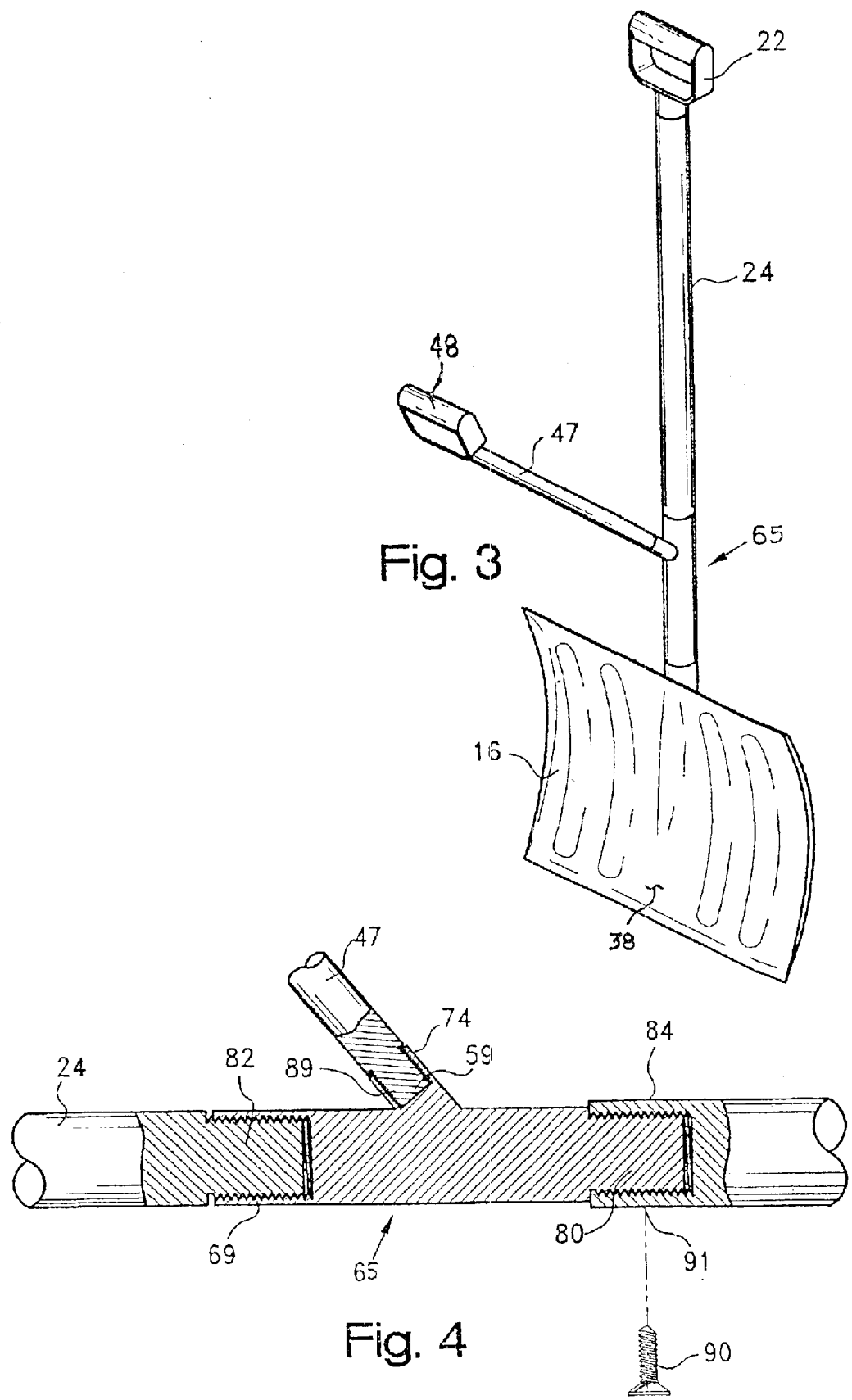

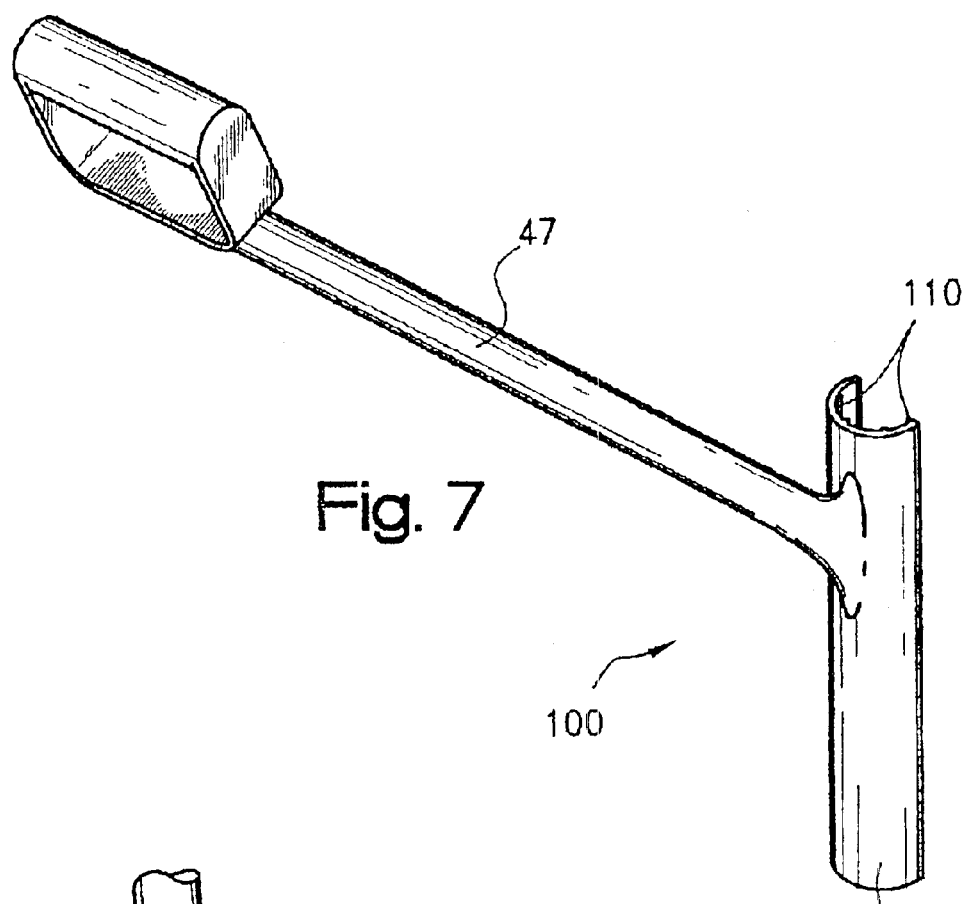
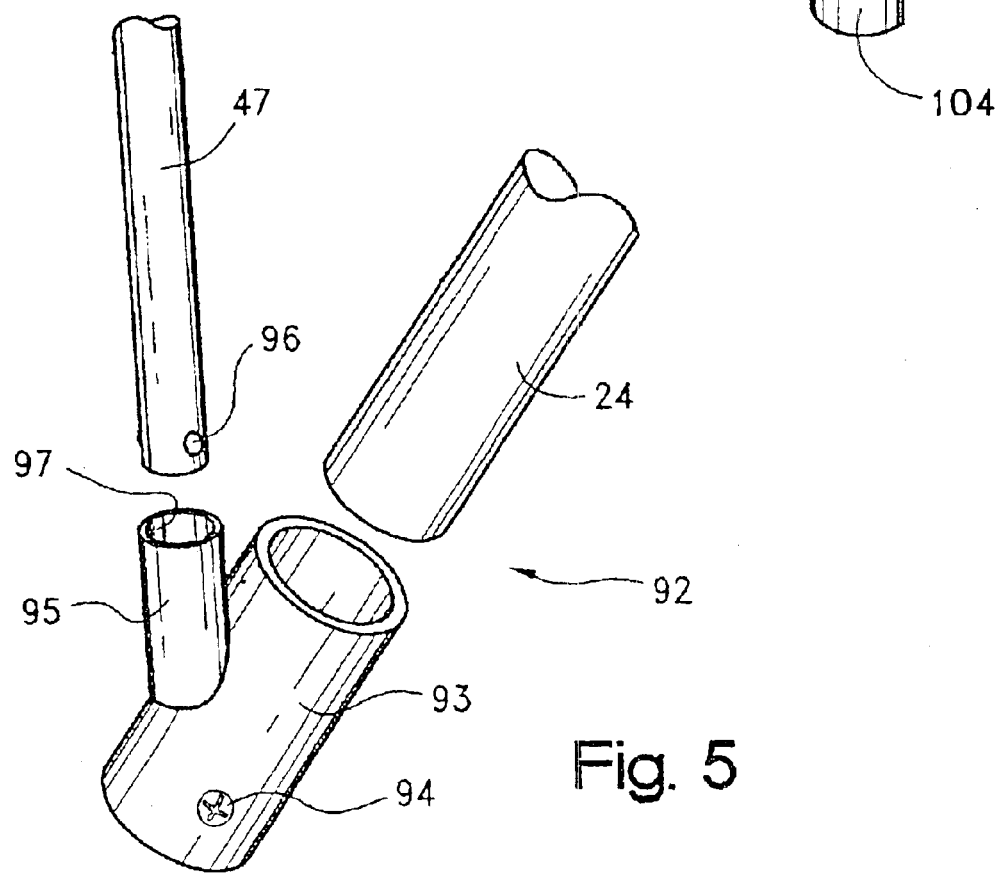

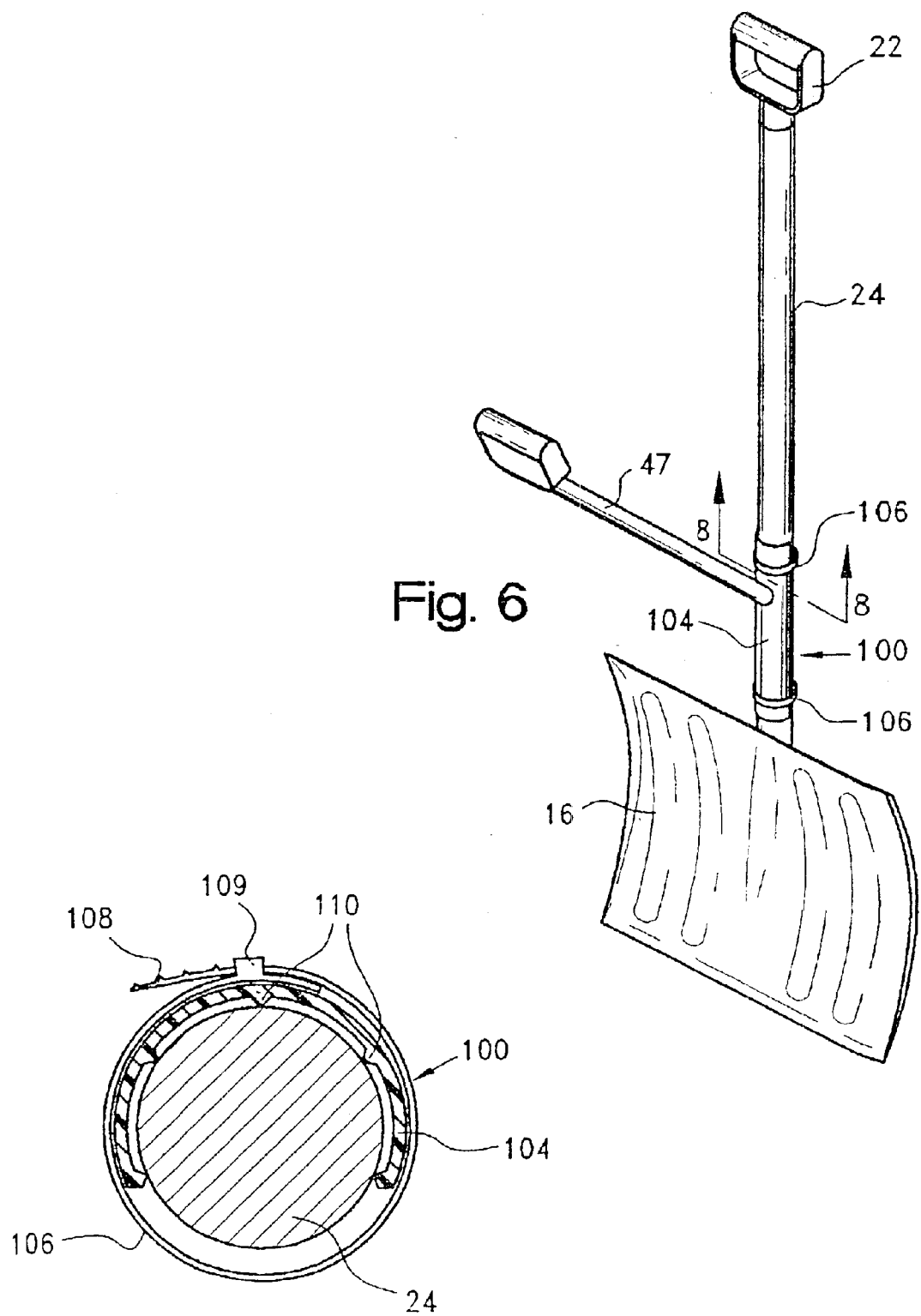

TWO-HANDLED SHOVEL

CROSS-REFERENCE TO RELATED CASES

The present application claims the benefit of the filing date of U.S. Provisional Application Ser. No. 60/363,690; filed Mar. 12, 2002, the disclosure of which is incorporated herein by reference.

FIELD OF THE INVENTION

The present invention relates generally to lifting implements, and more particularly to shovels for shoveling snow, dirt, etc.

BACKGROUND OF THE INVENTION

Shovels conventionally have a primary handle comprising a long pole with a hand grip at one (upper) end. A blade is attached to the other (lower) end of the pole. The user grasps the hand grip with an upper hand and the pole with the lower hand, and uses the lower hand as a fulcrum to scoop, lift up and move (i.e., shovel) a product such as snow, dirt, etc. using the flat upper surface of the blade.

Improvements in the conventional shovel design are known whereby an auxiliary or secondary handle is provided. The secondary handle extends at an angle to the primary handle and has a second pole with a second hand grip at the upper end thereof. The lower end of the second pole is attached to the primary pole, typically near the blade. The secondary handle moves the lower hand away from the fulcrum point, which decreases the amount of bending required by the user and consequently the amount of stress and strain on the user's muscles. Two-handled shovels provide a more favorable position for the lower hand which initially does the bulk of the initial movement and subsequent lifting of the load from its rest position. Two-handled shovels are shown for example in U.S. Pat Nos. 3,751,094; 4,787,661; 5,133,582; and 5,411,305.

While the above-noted shovels appear to be appropriate for certain situations, it is believed that most if not all of such shovels have sophisticated attachment devices to secure the secondary handle to the primary handle. Some of the above-noted shovels have secondary handles which can pivot, rotate or have an adjustable length for ease of use and to customize the shovel for the particular user. While these features are attractive, applicant believes that such features add unnecessary cost and complication to the shovel, and as a result, two-handled shovels have not received wide-spread acceptance in the marketplace. Applicant thereby believes that there is a demand in the market for a two-handled shovel which provides the user with the benefits of increased leverage during the shoveling operation, but which is simple in structure and assembly, and is cost-effective to manufacture. Applicant further believes that there is a demand for a device which simply and easily modifies existing single-handled shovels into two-handled shovels such that users can immediately obtain the benefits of the two-handed shovel design without having to discard previously-purchased, one-handled shovels.

SUMMARY OF THE PRESENT INVENTION

The present invention provides a new and unique two-handled shovel which is simple and cost-effective to manufacture, and which is particularly useful for shoveling snow and dirt, or any other appropriate product. According to further aspects of the present invention, a device is provided which allows one-handled shovels to be easily modified into two-handled shovels such that the benefits of the two-handled shovel design can be immediately realized.

According to the present invention, the shovel includes a primary handle having a hand grip at an upper end for grasping by the user, a pole attached at its upper end to the hand grip, and a blade attached to the lower end of the pole. A secondary or auxiliary handle is provided having a second pole with second hand grip on an upper end for grasping by the user. The lower end of the auxiliary pole is secured to the main pole using one of the novel aspects of the present invention. In a first aspect, the auxiliary pole is secured to the main pole by inserting the lower end of the auxiliary pole into a bore formed in the main pole. Preferably, the lower end of the auxiliary pole is threaded, and the bore in the main pole is also threaded. The auxiliary pole can then be easily screwed into (and out of) the bore in the main pole. Alternatively, or in addition to the threaded attachment, adhesive can be used to secure the end of the auxiliary pole in the bore of the main pole.

The bore in the main pole is preferably formed proximate the blade, and preferably within about 6 inches for a conventional snow shovel. The auxiliary pole preferably extends out of the bore at an angle of between 40° and 60° to the main pole for proper leverage during the shoveling operation. A plurality of bores could also be formed in the main pole, all of which could be disposed in spaced-apart relation along the main pole for customization by the user. The bore(s) could also be formed at different angles.

According to further aspects of the present invention, the auxiliary pole can be secured to the main pole using a separate connecting device. In one aspect, the connecting device has a Y-shaped design with a first socket which receives the lower end of the main pole; a second socket which receives the lower end of the auxiliary pole; and a cylindrical post which is received within a socket on the blade. The lower end of the auxiliary pole can be retained within the second socket such as by a threaded attachment and/or by adhesive as in the first aspect described above. The auxiliary pole could also be secured to the main pole by a screw inserted radially inward through the second socket and into the auxiliary pole. The auxiliary pole could also have radially-outward extending pins on its lower end which are received in locking grooves along the inside of the second socket. Still further, the auxiliary pole could be formed in one piece with the connecting device. The main pole and the blade could be connected to the first socket and the post, respectively, using the same technique.

In another aspect, the connecting device comprises a tubular cuff or sleeve having a central through-bore which closely receives the main pole. The cuff can be secured to the main pole such as with a screw inserted radially-inward through the cuff and into the pole, and/or with adhesive. The cuff also has a socket extending outwardly at an angle to receive the auxiliary pole. The auxiliary pole can be secured within the socket in the manner described previously, i.e., by a threaded attachment, a screw, adhesive, pin-in-groove, being formed in one piece, etc. The socket for the auxiliary pole can also be connected to the cuff with a slightly flexible connection to allow the auxiliary pole to move slightly (flex) with respect to the main pole during use to facilitate the shoveling operation.

In a still further aspect, a semicircular cuff or sleeve is located along the main pole near the blade. The cuff is preferably formed from slightly flexible material to enable it to be clipped over the main pole and easily conform to the outside surface of the main pole. Preferably one or more clamps or buckles are used to secure the semicircular cuff to the main pole, such as by tensioning a pair of clamps (one at each end of the cuff) around the cuff and pole until the cuff is secured thereto. The cuff also includes a socket extending outwardly at an angle to receive the auxiliary pole. The auxiliary pole can be connected to the socket as described above. Tips or nubs can also be formed on the inside surface of the cuff to assist in retaining the cuff on the main pole and prevent the cuff from moving with respect thereto.

In any of the above aspects of the present invention, the poles, blades and/or separate connecting device can be formed from inexpensive, rigid material such as plastic, metal or wood, using conventional techniques. The auxiliary pole can be easily attached to and detached from the main pole (of course if not adhesively attached) for quick assembly and disassembly by the user and for ease of manufacturing, shipping and display. In addition, the separate connecting device of the further aspects of the invention allows the user to modify or retrofit a previously-purchased, single-handled shovel such that the user can immediately obtain the benefits of the two-handled shovel design.

Further features and advantages of the present invention will become apparent upon reviewing the following specifications and appended drawings.

BRIEF DESCRIPTION OF THE DRAWINGS

FIG. 3 is a perspective view of a shovel constructed according to a further aspect of the present invention;

FIG. 4 is a cross-sectional enlarged side view of a portion of the shovel of FIG. 3;

FIG. 5 is a perspective view of a portion of a shovel constructed according to a still further aspect of the invention;

FIG. 6 is a perspective view of a shovel constructed according to yet another aspect of the present invention;

FIG. 7 is a perspective view of the auxiliary handle and connecting device for the shovel of FIG. 6; and FIG. 8 is a cross-sectional enlarged side view of a portion of the shovel of FIG. 6.

DETAILED DESCRIPTION OF THE PREFERRED EMBODIMENT

Figure 1:
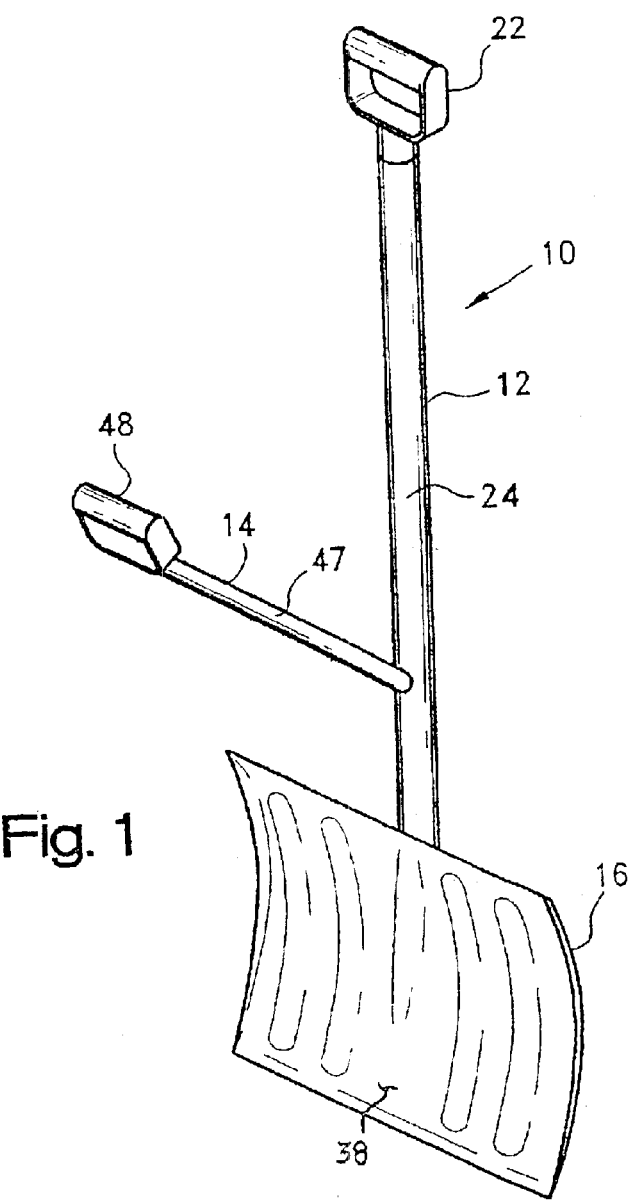
FIG. 1 is a perspective view of a two-handled shovel constructed according the principles of the present invention.

Referring to the drawings, and initially to FIG. 1, a shovel constructed according to the principles of the present invention is indicated generally at 10. The shovel 10 includes a main handle 12 and a second or auxiliary handle 14. The auxiliary handle 14 provides the user with increased leverage to shovel snow, dirt, or other appropriate products with a blade 16.

The main handle 12 includes a hand grip 22 at one (upper) end of a pole 24 and the blade 16 at the other (lower) end of pole 24. The hand grip preferably lies in the same plane as blade 16 to facilitate gripping and shoveling by the user. Hand grip 22 is preferably attached to the end of main pole 24 using a conventional technique, for example the hand grip can have a socket which receives the upper end of the pole 24. A screw or bolt can extend through a hole in the side of a socket and be threaded into the pole.

Blade 16 is also preferably conventional in design and includes a substantially flat upper surface 38 which is designed to carry loads of snow, dirt, etc. Blade 16 typically includes a connecting location (e.g., socket) on its opposite, lower surface which receives the lower end of the main pole and enables the main pole to be fastened to the blade. As with the hand grip 22, the lower end of pole 24 can be attached within the socket of the blade with a screw or bolt extending through a hole in the side of the socket and into the main pole.

The hand grip 22, main pole 24 and blade 16 are commercially-available from a number of sources, and are preferably formed from conventional, rigid materials which are long-lasting yet relatively inexpensive, for example, wood, plastic, metal or combinations thereof.

The second or auxiliary handle 14 is similar to the main handle 12. Specifically, the auxiliary handle 14 includes a pole 47 and a hand grip 48 on one (upper) end of, pole 47. Hand grip 48 is preferably connected in the same manner to pole 47, for example the end of auxiliary pole 47 can be received in a socket on the hand grip and secured therein with, e.g., a screw or bolt.

Figure 2:
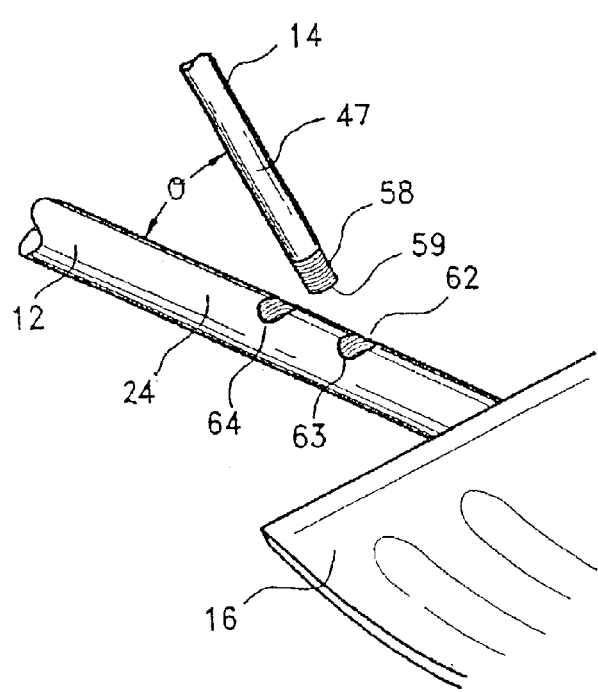
FIG. 2 is a partially-assembled view of the shovel of FIG. 1.

The other (lower) end of auxiliary pole 47 is connected, and preferably easily and removeably connected, to main pole 24 using one of the novel aspects of the present invention. For example, as illustrated in FIG. 2, auxiliary pole 47 can be received within a bore 62 formed in main pole 24. Preferably, auxiliary pole 47 includes radially-outward directed threads 58 on the lower end 59, while bore 62 includes radially-inward directed threads 63. The threads 63 in pole 47 mate with and cooperate with the threads 58 on auxiliary pole 47 to securely retain the pole within the bore. The threaded attachment can be formed using conventional threading tools and allows the auxiliary pole to be easily threaded into and threaded out of bore 62.

In addition (or alternatively) to the threaded attachment described above, the auxiliary pole can be adhesively secured within bore 62. A conventional adhesive can be either applied directly to the threads on the auxiliary pole and/or to the threads in the bore to improve the threaded attachment of these components, or even as a sole means to secure the auxiliary pole to the main pole. In the latter case (i.e., when no threads are used), the auxiliary pole can merely have a smooth, rounded end which would fit within a smooth, rounded bore in the main pole, or a tongue-in-groove fit could be used. Of course, by using adhesive, the auxiliary pole cannot typically be easily removed from the bore in the main pole, which may be a drawback in certain situations as it is preferred that the auxiliary pole be easily removable for display and storage.

It is also anticipated that other attachment means could be used with the threaded and adhesive attachment techniques described above, or as a sole means for securing the auxiliary pole within the bore in the main pole. In a broad sense, applicant has determined that by inserting the auxiliary pole within a bore in the main pole, and securing it in some manner, a simple and cost-effective manner of assembling a two-handled shovel is provided.

The location of bore 62 along main pole 24 is preferably close to blade 16, for example within ten inches of the blade, and more preferably within six inches of the blade. It is believed that by locating the end of the auxiliary pole at this location, the auxiliary pole provides increased leverage during use. The location of the auxiliary pole can of course vary depending upon the particular situation, and upon the user's requirements. The angular orientation "θ" of main handle 14 with respect to auxiliary handle 12 can also vary depending upon the particular application and the user, however, it preferred that the auxiliary pole 47 extend at an angle of between 40° and 60°, and more preferably at an angle of between 50° and 53°, to the axis of the main pole 24. It is also preferred that pole 14 extend substantially perpendicular to the plane of hand grip 22 and blade 16, and that hand grip 48 extend generally parallel to hand grip 22.

While only a single bore should be appropriate for most situations, it is anticipated that a plurality of bores could be formed along main pole 24. For example, as shown in FIG. 2, a second bore 64 could be formed at a spaced-apart location from bore 62. More than two bores could of course be formed along the main pole, and a plurality of bores (equally spaced apart) would allow the user to chose an appropriate bore depending upon the particular user's body size, comfort or other requirement. The angular orientation of the bore(s), and hence of the auxiliary pole with respect to the main pole, can also vary to further customize the shovel for the particular user's needs.

Auxiliary handle 14 is also preferably formed from conventional materials, for example, plastic, wood, metal, or combinations thereof. Bore 62 (and any other bore) preferably extends entirely through main pole 24, however it is possible that any of the bores could be a blind end bore, as it is only necessary that the bore extend through an amount sufficient to secure the end of auxiliary pole 47 within the bore in the manner described above (threaded attachment, etc.). In addition, no particular dimension for main pole 24 or auxiliary pole 50 is necessary, however, it is preferred that auxiliary pole 47 have a relatively smaller diameter than the main pole 24 to reduce the structural weakening of the main pole caused by the bore(s). One dimension that has been found satisfactory is a 1⅜" diameter main pole and a ¾" diameter auxiliary pole. The outside diameter of threads 58 on auxiliary pole 47 can be substantially the same as the diameter of the auxiliary pole, or can be even slightly smaller to further prevent the weakening of the main pole. It is also preferred that the main pole 24 be longer than auxiliary pole 47, and typically about 30% longer than the auxiliary pole, for proper hand positioning.

As described above, the second or auxiliary handle 14 is relatively easy and inexpensive to manufacture, and can be simply and easily assembled with the main handle 12. If not adhesively attached, the auxiliary handle can also be easily removed from the main handle for storage and display. The auxiliary handle provides for increased leverage during the operation of the shovel for reducing stress on the body. The auxiliary handle can be pre-assembled at the factory with main handle 12, however, it is anticipated that the auxiliary handle 14 will be left unassembled until the user has purchased the shovel.

According to a further aspect of the present invention, as illustrated in FIGS. 3 and 4, the attachment between the main pole piece and the auxiliary pole piece can be accomplished with a separate connecting device, indicated generally at 65. Connecting device 65 can be interposed between main pole 24 and blade 16, and most preferably is located directly between main pole 24 and the connecting location (i.e., socket) on blade 16. In this aspect of the invention, the main hand grip 22, main pole 24, blade 16, auxiliary pole 47 and auxiliary hand grip 48 are constructed in substantially the same manner as in the first aspect of this invention, with the noted exceptions as will be described below.

The separate connecting device 65 preferably has a Y-shaped design with three branches (see FIG. 4). The connecting device has a first socket 69 at one branch designed to receive lower end 82 of main pole 24; a second socket 74 at a second branch designed to receive lower end 59 of auxiliary pole 47; and a cylindrical post 80 at the third branch designed to be inserted in socket 84 at the connecting location on blade 16. The lower end 82 of main pole 24, lower end 59 of auxiliary pole 47, and post 80 are preferably retained within their respective sockets using a threaded attachment. Specifically, lower end 82 of main pole 24 has outwardly-directed threads which cooperate with inwardly-directed threads on first socket 69; lower end 59 of auxiliary pole 47 has outwardly-directed threads which cooperate with inwardly-directed threads in second socket 74; and post 80 has outwardly-directed threads which cooperate with inwardly-directed threads in socket 84. Alternatively (or in addition to) the threaded attachment, other means for securing the auxiliary pole 47, the main pole 24 and/or the post 80 to the respective connecting device or socket could be used, such as adhesive (as indicated at 89 between lower end 59 of auxiliary pole 47 and socket 69), or screws or bolts (one of which is indicated at 90 received in hole 91). The auxiliary pole 47 could also be formed in one piece with connecting device 65.

As in the first aspect, more than one socket could be provided for auxiliary pole 47 along the separate connecting device, and the socket could be provided at different orientations to provide a certain amount of customization for the user.

According to a similar aspect illustrated in FIG. 5, a separate connecting device, indicated generally at 92, can be used to secure auxiliary pole 47 to main pole 24. In this aspect, the connecting device can comprise a tubular cuff or sleeve 93 with a central through-bore which closely receives main pole 24. The cuff 93 is secured at an appropriate location along main pole 24 using for example, a screw 94 inserted radially inward through the cuff and into the main pole 24. Other means for securing the auxiliary pole to the main pole could also be used, for example, adhesive could be applied between the main pole 24 and the cuff 93.

In this aspect, a socket 95 is preferably provided in one piece with sleeve 93 for receiving auxiliary pole 47. Auxiliary pole 47 can be received and secured in socket 95 in the same manner as described above with respect to the second aspect (i.e., with threads, adhesive or being formed in one piece therewith). Alternatively, radially-outward extending pins 96 disposed at the lower end of the auxiliary pole can be received in corresponding grooves 97 in the inside surface of socket 95 to secure the auxiliary pole to the cuff 93.

The separate connecting device described above in FIGS. 3–5 is preferably formed in one piece from an appropriate rigid, inexpensive material, such as plastic, wood or metal, and is easily manufactured using conventional techniques.

A still further aspect of the present invention is illustrated in FIGS. 6–8. In this aspect, separate connecting device 100 attaches the auxiliary pole 47 to main pole 24. Connecting device 100 comprises a semi-circular (half-cylinder) shaped cuff or sleeve 104, which can be located along the longitudinal extent of pole 24. Cuff 104 is preferably formed from an inexpensive and slightly flexible material, such as plastic. Cuff 104 preferably has about the same inside curvature (radius) as the outside curvature (radius) of pole 24 and encompasses (surrounds) slightly more than half (one-hundred eighty degrees) of the pole (see, e.g., FIG. 8), so that the cuff is open sufficiently such that it can still be easily located (pushed and snapped) over the pole, but such that it surrounds a significant portion of the pole so that the cuff can be rigidly and firmly connected around the pole (as will be described below).

Cuff 104 is preferably secured to pole 24 near (again—preferably within about six (6) inches from) blade 16 and extends away from the pole on the same side as the upper, working surface of blade 16, that is, the auxiliary pole 47 extends substantially perpendicular to the upper surface of blade 16. Cuff 104 is secured to pole 24 in an easy, preferably removably manner, such as with clamps 106 encircling the cuff and pole. Clamps 106 can be conventional hose or band clamps with a distal end 108 which is received within a socket 109 and retained therein with teeth located along one (outer) surface of the clamp. Such a clamp can be easily manipulated by the user to securely tighten the cuff around the main pole 24. Preferably at least two clamps are used, with the clamps being located at opposite ends of cuff 104. Of course it is possible that only a single clamp, or more than two clamps, could be used.

Clamps 106 can be entirely separate from cuff 104, can be attached in some manner, such as by being formed in one piece therewith, or can be formed separately and attached to the cuff with bolts or rivets. Circumferentially-extending grooves or channels could also be formed in the exterior surface of cuff 104 to prevent longitudinal movement of clamps 106, i.e., to prevent the clamps from sliding off the cuff. Clamps 106 are preferably formed from appropriate inexpensive and flexible material, such as plastic, using conventional techniques. Other types of clamps (or buckles) than those described above can of course be used. The cuff 104 could also be secured by more permanent means to the main pole, such as with screws or bolts inserted radially inward through the cuff 104 into pole 24, however, a removable device such as a clamp is preferred.

The flexibility of cuff 104 allows the user to easily conform the cuff to the outer dimension of pole 24 by merely tensioning down the clamps. If necessary or desirable, sharp tips or nubs 110 can be formed along the inside, otherwise smooth surface of cuff 104 to assist in fixing cuff 104 to the exterior surface of pole 24 and to prevent the cuff from moving during use. It is believed, however, that with the cuff surrounding more than half of the pole, and that by merely tensioning cuff 104 around pole 24, that cuff 104 will be securely drawn down and held to pole 24 and will normally be prevented from rotating or sliding with respect thereto. The easy attachment of connecting device 100 to pole 24 allows the connecting device to be marketed separately from the main shovel portion, and easily attached thereto as a retro-fit or later modification after purchase. The cuff 104 also allows the connecting device to be used with poles of slightly different diameters as the cuff easily and flexibly conforms to the particular dimension of the pole, and without having to maintain a large stock or different size connecting devices for different size poles.

Auxiliary pole 47 can be secured to cuff 104 in the same manner as described above with respect to connecting device 65 (e.g., with threaded connection, screws, adhesive, etc.), but in this aspect, the auxiliary pole is preferably formed in one piece (unitary) with cuff 14 at about the midpoint of the cuff. Preferably cuff 104 and pole 47 are formed from inexpensive, slightly flexible material, such as plastic. Pole 47 should be rigid enough to withstand repeated use under difficult conditions, however cuff 104 should also have some flexibility to enable the cuff to conform to the outer surface of the underlying pole. The length of cuff 106 can vary, but it is believed that it is only necessary that cuff 104 extend a short distance (3–6 inches) along main pole 24.

Also if necessary or desirable, arcuate-shaped wedges can be provided along with connecting device 100 to vary the angle at which auxiliary pole 47 extends away from main pole 24. This enables the user to easily modify the auxiliary pole for the user's particular requirements. The number or dimension of wedges used can be easily determined by the user, and the wedges could be easily inserted between the cuff 104 and pole 24 when the connecting device is being located over the pole. Alternatively or in addition to such wedges, the auxiliary pole 47 can have a slightly flexible connection to cuff 104, such as by tapering or narrowing pole 47 at the connection with the cuff, by providing the auxiliary handle with an "accordion" shape at the interface with the cuff, or by otherwise creating a slightly flexible interface between these two components. In so doing, the auxiliary pole 47 can move slightly with respect to cuff 104 during use, which it is believed would facilitate the shoveling operation.

The separate connecting device described above provides a simple and easy attachment between the main pole and the auxiliary pole of a two-handled shovel. The auxiliary handle and connecting device can be marketed with or without a main handle, to allow those who have previously purchased a single-handled shovel to purchase an auxiliary handle and connecting device to obtain the benefits of a two-handled shovel. If the auxiliary handle and connecting device are marketed together with a main handle, the auxiliary handle and connecting device can be pre-assembled at the factory with main handle, however, for space considerations, packaging and display, it is anticipated that the auxiliary handle and connecting device will be left unassembled until the user has purchased the shovel.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A shovel, comprising a main handle having (i) a main pole, (ii) a main hand grip attached at one end of the main pole, and (iii) a blade attached at another end of the main pole;

an auxiliary handle having (i) an elongated auxiliary pole, and (ii) an auxiliary hand grip at one end of the auxiliary pole; and a separate connecting device removably securing the auxiliary pole to the main pole, said separate connecting device comprising an elongated, flexible, C-shaped sleeve circumferentially surrounding more than half or the main pole, with an inside surface closely receiving the main pole, means for removably securing the sleeve to the main pole to prevent the sleeve from moving with respect to the main pole, and means for securing the other end of the auxiliary pole to the connecting device, wherein said securing means for the sleeve includes at least one band surrounding said sleeve and preventing said connecting device from moving relative to said main pole.

2. The shovel as in claim 1, wherein said sleeve has an inside surface configuration substantially matching an external surface configuration of the main pole, said sleeve extending longitudinally along an extent of said main pole to enable said inside surface configuration of said sleeve to be in surface-to-surface contact with said external surface configuration of said main pole.

3. The shovel as in claim 1, further including nubs projecting away from said inside surface of said sleeve and contacting said main pole to prevent said connecting device from moving with respect to said main pole.

4. The shovel as in claim 1, wherein said auxiliary pole is formed unitary, in one piece with said connecting device.

5. The shovel as in claim 1, wherein said auxiliary pole comprises a single piece extending from one end to said other end.

6. The shovel as in claim 1, wherein the band can be tensioned around the sleeve, and the flexibility of the sleeve allows the sleeve to be tightly drawn against the main pole.

7. The shovel as in claim 1, wherein the connecting device is secured to the main pole proximate the blade, and the auxiliary pole extends at an acute angle relative to the main pole, and has a length such that when the user manually grasps the main hand grip with one hand and the auxiliary hand grip with the other hand during the shoveling process, the auxiliary hand grip provides significant leverage to minimize bending of the torso by the user.

8. The shovel as in claim 7, wherein the auxiliary pole extends at an angle of 40 to 60 degrees relative to the main pole, and the length of the auxiliary pole is about 70 percent of the length of the main pole.

9. A shovel attachment, comprising:
   an auxiliary handle having (i) an elongated auxiliary pole, and (ii) an auxiliary hand grip at one end of the auxiliary pole; and
   a connecting device at another end of the auxiliary pole for securing the auxiliary pole to a main pole, said connecting device comprising an elongated, flexible, C-shaped sleeve secured via securing means unitary with the other end of said auxiliary pole and extending circumferentially more than one hundred and eighty degrees, and means for removably securing the sleeve to the main pole to prevent the sleeve from moving with respect to the main pole, wherein said securing means for the sleeve includes at least one band for surrounding the main pole, the band being tensionable to draw the sleeve around the main pole.

10. The shovel attachment as in claim 9, wherein the sleeve has a cylindrical inside surface.

11. The shovel attachment as in claim 9, wherein the band is attached to the sleeve.

12. The shovel attachment as in claim 9, further including nubs projecting away from the inside surface of said sleeve for contacting the main pole to prevent said connecting device from moving with respect to the main pole.

13. The shovel attachment as in claim 9, wherein the auxiliary pole extends at an angle of 40 to 60 degrees relative to a longitudinal axis of the connecting device.

14. A shovel, comprising a main handle having (i) a main pole (ii) a main band grip attached at one end of the main pole, and (iii) a blade attached at another end of the main pole;
   an auxiliary handle having (i) an elongated auxiliary pole, and (ii) an auxiliary hand grip at one end of the auxiliary pole; and
   a separate connecting device removably securing the auxiliary pole to the main pole, said separate connecting device comprising an elongated, flexible, C-shaped sleeve with an inside surface closely receiving the main pole and circumferentially surrounding more than one hundred and eighty degrees of the main pole, means for removably securing the sleeve to the main pole to prevent the sleeve from moving with respect to the main pole, and means for securing the other end of the auxiliary pole to the connecting device,
   wherein the connecting device is secured to the main pole proximate the blade, and the auxiliary pole i) is retained by the connecting device at an acute angle relative to the main pole, and ii) has a length, such that when the user manually grasps the main hand grip with one hand and the auxiliary hand grip with the other hand during the shoveling process, the auxiliary hand grip provides significant leverage to minimize bending of the torso by the user, wherein said securing means for the sleeve includes at least one band for surrounding the main pole, the band being tensionable to draw the sleeve around the pole.

15. The shovel as in claim 14, wherein the sleeve has a cylindrical inside surface.

16. The shovel as in claim 14, wherein the band is attached to the sleeve.

17. The shovel as in claim 14, further including nubs projecting away from the inside surface of said sleeve for contacting the main pole to prevent said connecting device from moving with respect to the main pole.

18. The shovel as in claim 14, wherein the auxiliary pole extends at an angle of 40 to 60 degrees relative to the main pole, and the length of the auxiliary pole is about 70 percent of the length of the main pole.

* * * * *